US009412262B2

(12) United States Patent
Baker et al.

(10) Patent No.: US 9,412,262 B2
(45) Date of Patent: Aug. 9, 2016

(54) WIRELESS TWO-WAY COMMUNICATION PROTOCOL FOR AUTOMATED FURNITURE ACCESSORY INTEGRATION

(71) Applicant: L & P PROPERTY MANAGEMENT COMPANY, South Gate, CA (US)

(72) Inventors: Chad Baker, Georgetown, KY (US); Ryan Edward Chacon, Carthage, MO (US); Dave Jones, St. Charles, MO (US); David M. Linhoff, St. Peters, MO (US); William Rohr, Joplin, MO (US)

(73) Assignee: L&P Property Management Company, South Gate, CA (US)

( * ) Notice: Subject to any disclaimer, the term of this patent is extended or adjusted under 35 U.S.C. 154(b) by 67 days.

(21) Appl. No.: 13/749,087

(22) Filed: Jan. 24, 2013

(65) Prior Publication Data

US 2014/0203919 A1 Jul. 24, 2014

(51) Int. Cl.

| | |
|---|---|
| ***G01M 1/38*** | (2006.01) |
| ***A47C 20/00*** | (2006.01) |
| ***G04B 7/00*** | (2006.01) |
| ***G06F 7/00*** | (2006.01) |
| ***G08C 17/02*** | (2006.01) |

(52) U.S. Cl.
CPC ............ *G08C 17/02* (2013.01); *G08C 2201/41* (2013.01)

(58) Field of Classification Search
CPC .................................. G08C 17/02; G05D 1/00
USPC ........... 340/12.5, 4.1; 455/41.2, 41.3; 465/17, 465/18, 50; 700/275, 83
See application file for complete search history.

(56) References Cited

U.S. PATENT DOCUMENTS

| | | | |
|---|---|---|---|
| 5,086,385 | A | 2/1992 | Launey et al. |
| 5,109,222 | A | 4/1992 | Welty et al. |
| 5,602,664 | A | 2/1997 | Doyle et al. |
| 5,636,211 | A | 6/1997 | Newlin et al. |

(Continued)

FOREIGN PATENT DOCUMENTS

| | | | |
|---|---|---|---|
| EP | 2549684 | A4 | 7/2014 |

OTHER PUBLICATIONS

PCT Appl. No. PCT/US2013/077557, Search Report dated May 6, 2014; 38 pages.

(Continued)

*Primary Examiner* — Nam V Nguyen
(74) *Attorney, Agent, or Firm* — Shook, Hardy & Bacon, L.L.P.

(57) ABSTRACT

A system and method for integrating furniture accessories with automated furniture items is provided. In embodiments, a communication protocol enables a remote device to control an automated furniture accessory coupled to a control component of an automated furniture item. Items of identifying information are provided to a control component based on coupling the automated furniture accessory to the CAN bus of the control component. According to the communication protocol, one or more packets of information are provided to the remote device using a wireless communication device of the control component. The remote device may then be used to control features of the automated furniture accessory, based on wireless communication with the control component. In some embodiments, the firmware of the remote device may be updated to enable the control component to be coupled to updated automated furniture accessories, and enable the remote device to control such accessories.

14 Claims, 3 Drawing Sheets

(56) References Cited

U.S. PATENT DOCUMENTS

| | | | | |
|---|---|---|---|---|
| 5,782,036 | A * | 7/1998 | Bertieri et al. | 49/25 |
| 5,963,624 | A | 10/1999 | Pope | |
| 6,169,879 | B1 * | 1/2001 | Perlman | 725/119 |
| 6,256,739 | B1 | 7/2001 | Skopp et al. | |
| 6,285,912 | B1 | 9/2001 | Ellison et al. | |
| 6,469,633 | B1 | 10/2002 | Wachter | |
| 6,542,076 | B1 * | 4/2003 | Joao | 340/539.14 |
| 6,748,278 | B1 | 6/2004 | Maymudes | |
| 6,870,477 | B2 | 3/2005 | Gruteser et al. | |
| 6,964,370 | B1 | 11/2005 | Hagale et al. | |
| 6,998,955 | B2 * | 2/2006 | Ballew et al. | 340/5.1 |
| 7,006,006 | B2 | 2/2006 | Witkow et al. | |
| 7,009,522 | B2 | 3/2006 | Flanagan et al. | |
| 7,044,619 | B2 | 5/2006 | Sanderlin et al. | |
| 7,135,958 | B1 * | 11/2006 | Suuronen et al. | 340/5.62 |
| 7,136,913 | B2 | 11/2006 | Linderman | |
| 7,151,968 | B2 * | 12/2006 | Williamson | 700/65 |
| 7,171,708 | B2 * | 2/2007 | Osborne et al. | 5/618 |
| 7,349,772 | B2 * | 3/2008 | Delaney et al. | 701/2 |
| 7,379,778 | B2 | 5/2008 | Hayes et al. | |
| 7,583,197 | B2 * | 9/2009 | Wesby Van Swaay | 340/573.4 |
| 7,680,878 | B2 | 3/2010 | Tsuchida et al. | |
| 7,768,420 | B2 | 8/2010 | Neogi et al. | |
| 7,812,739 | B2 * | 10/2010 | Chuey | 340/12.5 |
| 8,310,348 | B2 * | 11/2012 | Fang | G05B 19/042 340/12.5 |
| 8,634,720 | B2 | 1/2014 | Petricoin, Jr. et al. | |
| 8,713,301 | B2 * | 4/2014 | Fredriksson | 713/151 |
| 8,816,845 | B2 | 8/2014 | Hoover et al. | |
| 8,926,535 | B2 * | 1/2015 | Rawls-Meehan | A47C 20/041 5/617 |
| 2004/0036624 | A1 | 2/2004 | Ballew et al. | |
| 2004/0203387 | A1 | 10/2004 | Grannan | |
| 2008/0077020 | A1 | 3/2008 | Young et al. | |
| 2008/0262657 | A1 | 10/2008 | Howell et al. | |
| 2009/0100599 | A1 | 4/2009 | Rawls-Meehan | |
| 2010/0052576 | A1 | 3/2010 | Steiner et al. | |
| 2010/0162285 | A1 | 6/2010 | Cohen et al. | |
| 2012/0072236 | A1 | 3/2012 | Atkin | |
| 2012/0072238 | A1 | 3/2012 | Collins, Jr. et al. | |
| 2012/0112891 | A1 | 5/2012 | Rawls-Meehan | |
| 2013/0024018 | A1 | 1/2013 | Chang et al. | |
| 2013/0174343 | A1 | 7/2013 | Chacon et al. | |
| 2013/0199420 | A1 | 8/2013 | Hjelm | |
| 2013/0247302 | A1 | 9/2013 | Chacon et al. | |
| 2014/0302795 | A1 | 10/2014 | Chacon et al. | |

OTHER PUBLICATIONS

International Search Report with Written Opinion dated May 4, 2015 in Application No. PCT/US2015/012211, 13 pages.

International Preliminary Report on Patentability dated Aug. 6, 2015 in Application No. PCT/US2013/077557, 9 pages.

International Search Report with Written Opinion dated Sep. 8, 2015 in Application No. PCT/US2015/036227, 13 pages.

Non-Final Office Action dated Sep. 25, 2015 in U.S. Appl. No. 14/164,132, 15 pages.

Final Office Action dated May 12, 2016 in U.S. Appl. No. 14/164,132, 16 pages.

* cited by examiner

WIRELESS TWO-WAY COMMUNICATION PROTOCOL FOR AUTOMATED FURNITURE ACCESSORY INTEGRATION

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Embodiments of the present invention generally relate to a wireless, two-way communication protocol for integrating furniture accessories with automated furniture items. More particularly, embodiments of the present invention relate to a communication protocol for using a remote device to control an automated furniture accessory coupled to a control component of an automated furniture item.

BACKGROUND OF THE INVENTION

A variety of methods exist for using a controller to manipulate an automated furniture item. Such controllers direct the operation of various "standard" integrated elements for automated furniture items, such as a head motor or foot motor on an adjustable bed. However, external accessories may also be provided for use with an automated furniture item, such as a heating blanket. Unless the heating blanket is integrated into the control system of the automated furniture item, it will likely be controlled separately from the furniture item, requiring an additional device and/or remote. Further, the controller of an automated furniture item is typically equipped with the necessary firmware to operate the standard devices provided with the furniture item (i.e., those devices that the manufacturer intended to be operated by the furniture item controller).

Accordingly, a need exists for a communication protocol that enables additional, automated furniture accessories to be operated by an automated furniture controller without the need to update the firmware of the furniture item controller.

BRIEF SUMMARY OF THE INVENTION

The present invention generally relates to a system and method for integrating automated furniture accessories with automated furniture items. Embodiments of the invention include a communication protocol for using a remote device to control an automated furniture accessory coupled to a control component of an automated furniture item.

One illustrative embodiment of the invention, a system for integrating automated furniture accessories with automated furniture items includes a control component comprising: (1) a wireless communication device; (2) a CAN bus; and (3) at least one automated furniture accessory coupled to the CAN bus, wherein one or more features of the at least one automated furniture accessory are controlled by a remote device wirelessly coupled to the control component.

In another illustrative aspect, a method for integrating automated furniture accessories with automated furniture items comprises: receiving an indication of an automated furniture accessory coupled to a control component; identifying one or more packets of information associated with the automated furniture accessory; and communicating at least one of the one or more packets of information to a remote device, wherein the remote device is adapted to control one or more features of the automated furniture accessory based at least in part on communication between the remote device and the control component.

According to a third illustrative aspect, embodiments of a method for integrating automated furniture accessories with automated furniture items comprises receiving one or more items of identifying information associated with at least one automated furniture accessory coupled to a control component and communicating at least one of the one or more items of identifying information to a remote device, wherein the remote device is in wireless, two-way communication with the control component, wherein one or more features of the at least one automated furniture accessory are controlled by the remote device based on communication of the at least one of the one or more items of identifying information.

Additional objects, advantages, and novel features of the invention will be set forth in part in the description that follows, and in part will become apparent to those skilled in the art upon examination of the following, or may be learned by practice of the invention.

BRIEF DESCRIPTION OF SEVERAL VIEWS OF THE DRAWING

The present invention is described in detail below with reference to the attached drawing figures, wherein.

DETAILED DESCRIPTION OF THE INVENTION

Figure 1:
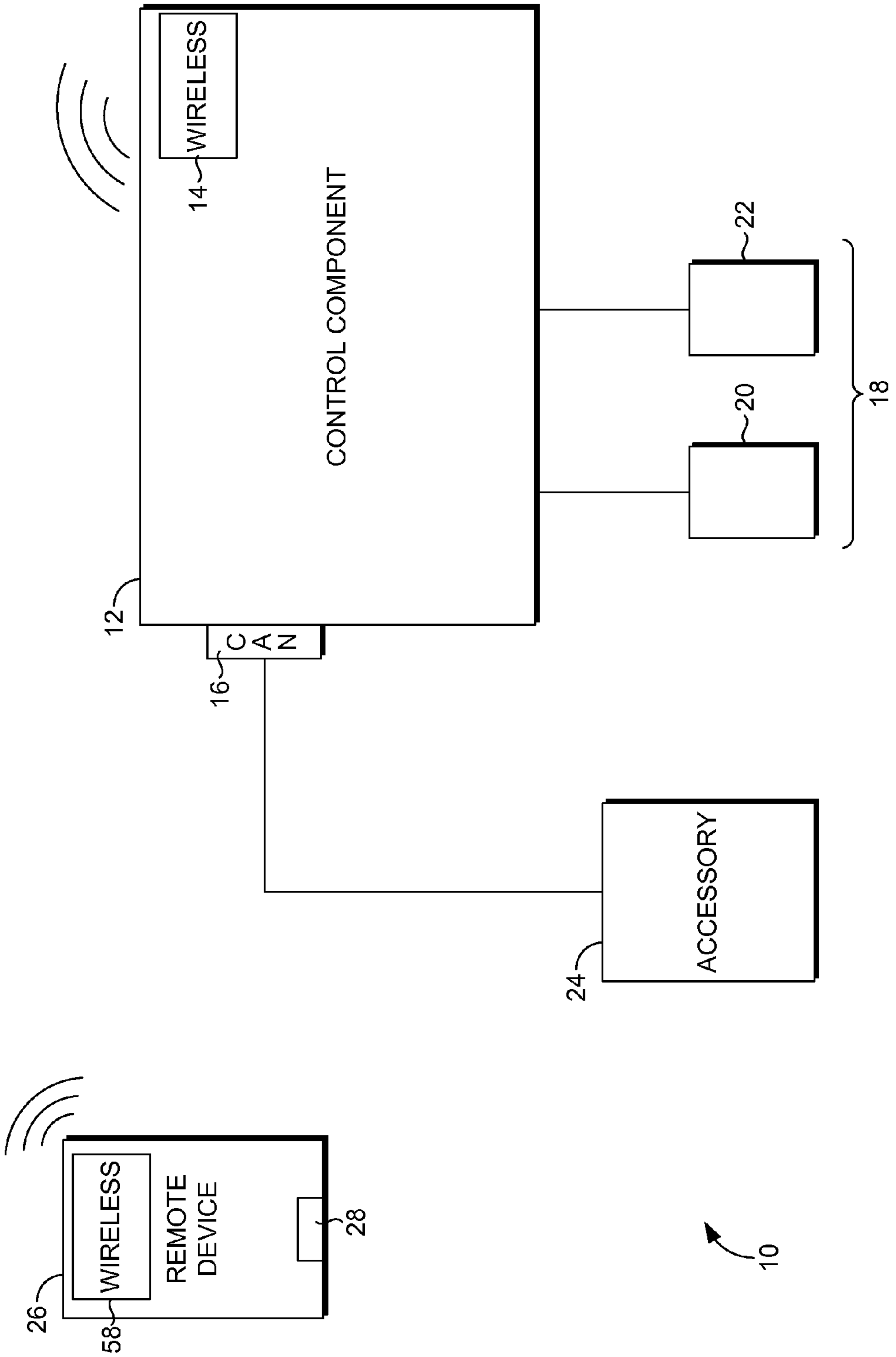
FIG. 1 is a system for integrating automated furniture accessories with automated furniture items, in accordance with an embodiment of the invention.

An embodiment of a system 10 for integrating automated furniture accessories with automated furniture items is seen in FIG. 1. In the embodiment of FIG. 1, the system 10 generally includes a control component 12 having a wireless communication device 14, a controller area network (CAN) bus 16, integrated features 18 including a head motor 20 and a foot motor 22, and an automated furniture accessory 24 coupled to the CAN bus 16 of the control component 12. Further, the control component 12 is depicted as being in wireless communication with a remote device 26 having a data port 28 and a wireless communication device 58.

In one embodiment, control component 12 controls various features of an automated furniture item that are operated based on commands received by the control component 12. For example, the control component 12 may control integrated features 18 that are integral to the operation of the automated furniture item, such as a head motor 20 that raises and lowers the head of an adjustable bed. Although exemplary integrated features 18 are shown in FIG. 1, such as the head motor 20 and the foot motor 22, it should be understood that any number or combination of integrated features 18 may be coupled to the control component 12, such as a massage motor, a programming port, a wired remote device, and the like.

In some embodiments, the control component 12 includes a processor and a memory capable of receiving and processing commands that are identifiable using the firmware of the control component 12. For example, the control component 12 may receive a command to operate one or more of the integrated features 18 coupled to the automated furniture item. Accordingly, a remote device 26 may receive an input command from a user, which the remote device 26 transmits, wirelessly, to the wireless communication device 14 of control component 12, using wireless communication device 58. The command may relate to one or more of the integrated features 18 coupled to the control component 12, such as a command to lower both the head and the foot of an automated bed (using head motor 20 and foot motor 22).

Wireless communication device 14 may be used in the transmission of wireless commands to and from the control component 12. As such, wireless communication device 14 may be any wireless communication device used to transmit wireless communication to and from one or more remote devices that communicate wirelessly with the control component 12. For example, the wireless communication device 14 may be a wireless device that executes a two-way communication protocol, such as a MiWi and/or Zigbee protocol. In further embodiments, wireless communication device 14 communicates using 2.4 GHz protocols, including 2.4 GHz side bands or 2.4 GHz stacks. Additionally, in one example, wireless communication device 14 may execute a RF4CE protocol. In some embodiments, wireless communication device 14 is used to communicate wirelessly between the control component 12 and the remote device 26, which may also be referred to as a remote control.

In addition to communicating via wireless communication device 14, the control component 12 may also interact with external devices that are coupled to the control component 12, such as the automated furniture accessory 24 coupled to the CAN bus 16 of the control component 12. In embodiments, CAN bus 16 may directly or indirectly couple one or more automated furniture accessories 24 to control component 12. In one example, integrated features 18 may be directly coupled to the control component 12 (e.g., distributed with the control component 12 upon manufacture of the automated furniture device), while automated furniture accessories 24 may be coupled to the control component 12 at any time (e.g., after purchase of the automated furniture item having the control component 12). In other words, in some embodiments, automated furniture accessories 24 may be coupled to the control component 12 of an automated furniture item that was not sold with such accessories.

In embodiments of the present invention, remote device 26 may be used to control one or more automated furniture accessories 24 coupled to a control component 12 of an automated furniture item. For example, an automated furniture accessory 24, such as an electric heating blanket, may be plugged in to the CAN bus 16 of the control component 12. Upon connection with the CAN bus 16, items of information regarding the particular automated furniture accessory 24 plugged into the CAN bus 16 may be transmitted to the control component 12. Such items of information may include the identity of the automated furniture accessory 24, its manufacturer, a particular type of device (such as a type of heating blanket), general identifying information, placeholders, and other types of information that are identifiable by the control component 12. In some embodiments, items of identifying information may be retrieved from the automated furniture accessory 24 by the control component 12, by virtue of the connection via CAN bus 16.

Having received identifying information regarding the particular automated furniture accessory 24 plugged in to the CAN bus 16, control component 12 may then transmit one or more packets of information to the remote device 26, such as a remote control, according to a communication protocol. The remote device 26 receives the items of information over a wireless connection between the control component 12 and the remote device 26, utilizing the wireless communication device 14. In embodiments, the packets of information communicated between control component 12 and remote device 26 identify the particular automated furniture accessory 24 according to a protocol for communication between the control component 12 and the remote device 26. In further embodiments, control component 12 acts as a 2-way wireless/CAN bridge such that an automated furniture accessory 24 (e.g., an inexpensive CAN accessory) can receive direct commands from the remote device 26.

Figure 2:
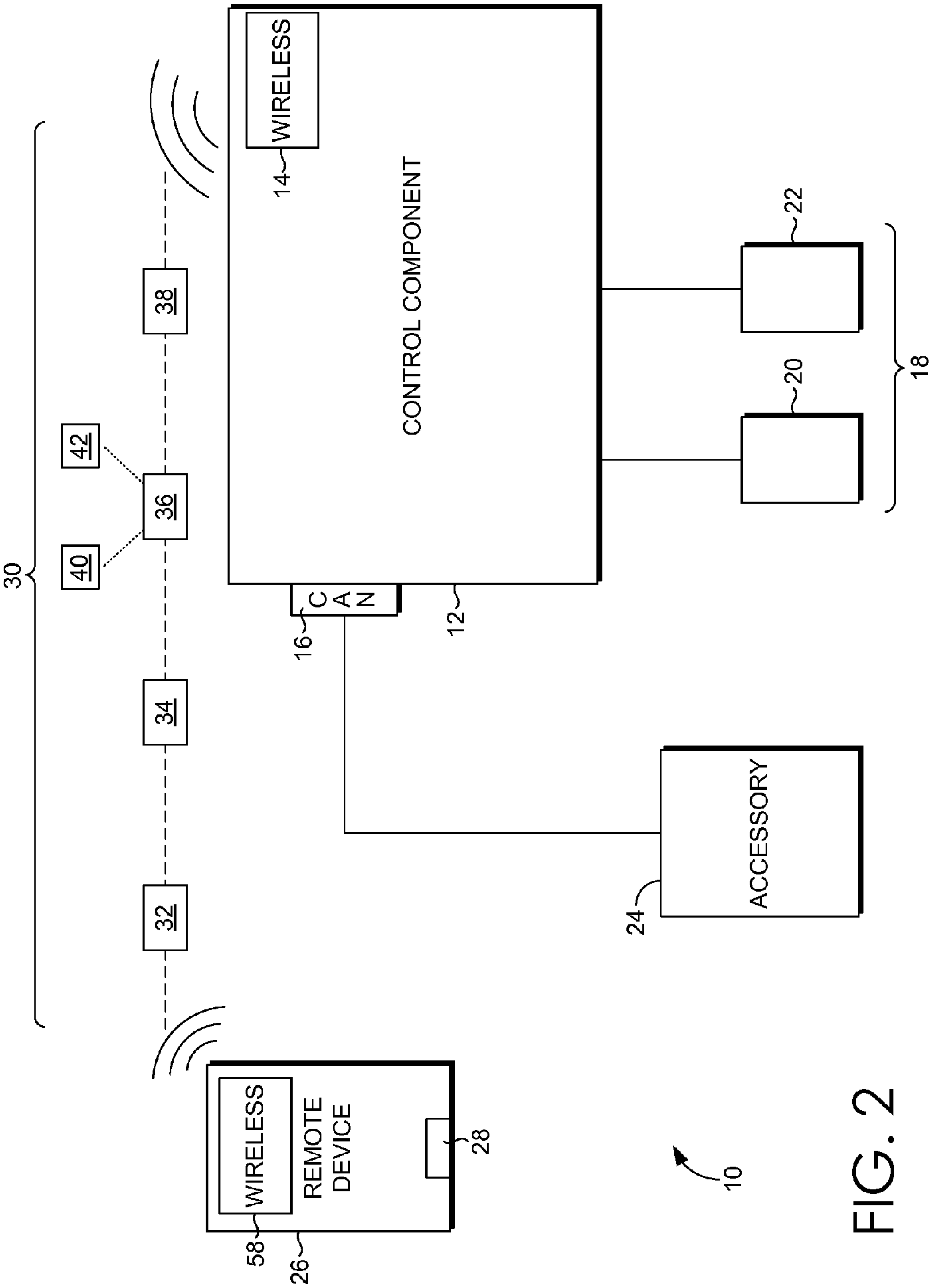
FIG. 2 is the system of FIG. 1 for integrating automated furniture accessories with automated furniture items, including a plurality of packets of a communication protocol, in accordance with an embodiment of the invention.

In another example, a communication protocol may specify particular packets of information that are required to be received by the remote device 26 before the remote device 26 can remotely direct the operation of the automated furniture accessory 24. Referring now to FIG. 2, packets of information 30 may be transmitted between control component 12 and remote device 26 using wireless communication device 14. Such exemplary packets may include a header packet 32, a message ID packet 34, message content packet 36, and a device ID packet 38. As will be understood, the type and number of packets transmitted as part of the communication protocol may vary, and any number of packets may be communicated between the control component 12 and the automated furniture accessory 24.

In one embodiment, header packet 32 provides information that identifies items such as a type of sender of a packet, a type of intended receiver of the packet, a message type, and the like. For example, header packet 32 may identify a control component 12 as the sender of a packet of data according to a communication protocol. In another embodiment, message ID packet 34 provides information regarding a CAN bus and/or MiWi wireless communication device 14 involved in a transmission according to a communication protocol. For example, a message ID packet 34 may identify CAN bus 16 as being involved with the transmission according to a communication protocol. As such, the header packet 32 and/or the message ID packet 34 provide identifying information regarding the sender and receiver of a message, and the type of message that will be transmitted using one or more devices.

In further embodiments, a message content packet 36 provides the content of a message transmitted according to a communication protocol. For example, a message content packet 36 may include instructions to manipulate one or more automated furniture accessories 24 coupled to the CAN bus 16 of a control component 12. As such, in some embodiments, message content packet 36 may include status data 40 and/or command data 42. In embodiments, status data 40 provides a status of one or more devices coupled to the control component 12. For example, status data 40 may indicate, as part of a message content packet 36, whether an automated furniture accessory 24 (such as a heating blanket) is turned to a highest power. Similarly, command data 42 may indicate, as part of a message content packet 36, a particular command directed at one or more devices coupled to the control component 12. For example, command data 42 may indicate, as part of a message content packet 36, a direction to manipulate one or more features of an automated furniture accessory 24 coupled to the control component 12, such as directing the lowering of temperature on a heating blanket.

In yet another embodiment, exemplary packets of information 30 may include a device ID packet 38 that specifically identifies one or more items of hardware coupled to the control component 12. For example, device ID packet 38 may indicate a particular type of automated furniture accessory 24 for control by the remote device 26. Accordingly, any number of device ID packets 38 may be transmitted between control component 12 and remote device 26.

In some embodiments, a communication protocol for controlling one or more automated furniture accessories 24 coupled to the control component 12 may include the transmission of one or more packets of information 30 between the control component 12 and the remote device 26. As such, in some embodiments, a control component 12 may determine one or more packets of information 30 to transmit to remote device 26. The determined one or more packets of information 30 may then enable the remote device 26 to control one or more automated furniture accessories 24 coupled to the control component 12, by virtue of the wireless connection between the remote device 26 and the control component 12.

In some embodiments, an automated furniture accessory 24 may be associated with one or more items of updateable information that may be changed after a user has initially coupled the particular automated furniture accessory 24 to the control component 12. In other words, after a remote device 26 has been configured to control a particular automated furniture accessory 24, one or more updates may become available for the automated furniture accessory 24. Accordingly, in some embodiments, the firmware of remote device 26 may be updated using data port 28. Data port 28 may be any feature associated with the remote device 26 that is capable of receiving data, such as a USB port. In one example, an updated feature of the automated furniture accessory 24 may be communicated to the control component 12 based on inputting the new and/or updated information into data port 28, such as plugging in a USB device containing such updated information.

In a further embodiment, a new and/or updated automated furniture accessory 24 may be coupled to the control component 12. In one embodiment, the control component 12 may be unable to recognize the newly-added automated furniture accessory 24. For example, the control component 12 may have been manufactured without the ability to recognize and/or process particular commands associated with the new and/or updated automated furniture accessory 24. In another example, the control component 12 may be unable to determine one or more items of information to communicate according to the communication protocol, in order to delegate control of the automated furniture accessory 24 to the remote device 26. As such, one or more updates may be provided to the remote device 26 via data port 28, and communicated from the remote device 26 to the control component 12 using wireless communication device 14. Accordingly, the remote device 26 may receive updates via data port 28, communicate such updates to the control component 12, and enable the control component 12 to exchange communication with the remote device 26 regarding the control of the automated furniture accessory 24.

Figure 3:
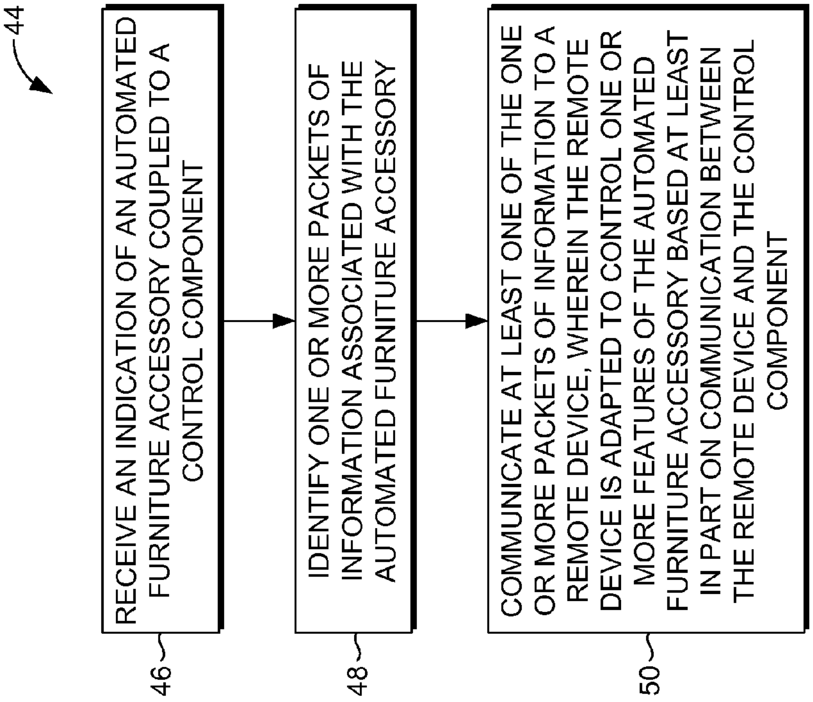
FIG. 3 is flow diagram of a method for integrating automated furniture accessories with automated furniture items, in accordance with an embodiment of the invention.

Referring next to FIG. 3, an exemplary flow diagram 44 of a method for integrating automated furniture accessories with automated furniture items is provided. At block 46, an indication of an automated furniture accessory coupled to a control component is received. For example, such an indication may be received based on plugging an automated furniture accessory 24 into a CAN bus 16. At block 48, one or more packets of information associated with the automated furniture accessory are identified. As discussed above, in some embodiments, a control component 12 may identify one or more items and/or packets of information 30 according to a communication protocol for control of the automated furniture accessory 24 by a remote device 26. As such, at block 50, at least one of the one or more packets of information is communicated to a remote device that is then adapted to control one or more features of the automated furniture accessory based on the communication between the remote device and the control component. For example, having received one or more packets of information 30 from the control component 12, the remote device 26 may control one or more features of the automated furniture accessory 24.

Figure 4:
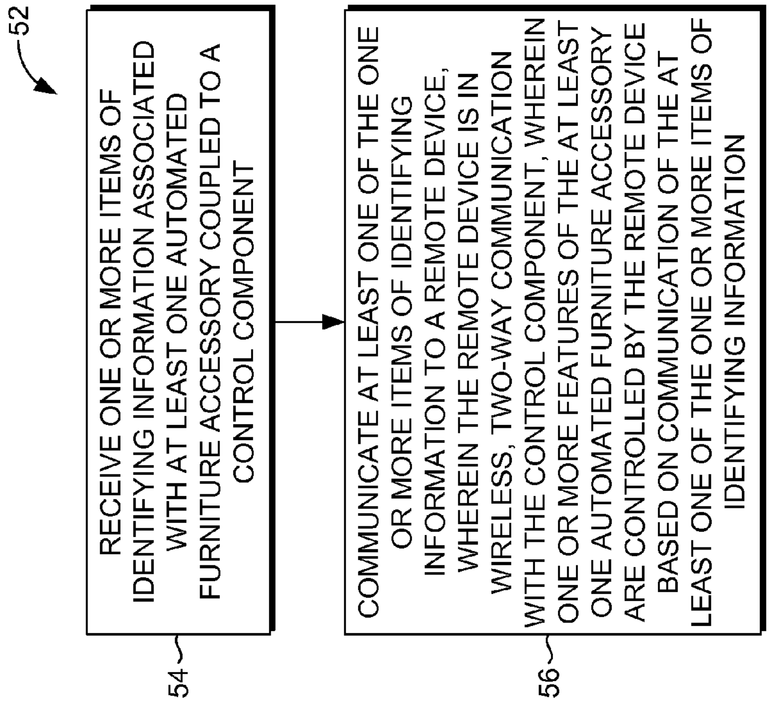
FIG. 4 is a flow diagram of a method for integrating automated furniture accessories with automated furniture items, in accordance with an embodiment of the invention.

Turning now to FIG. 4, a flow diagram 52 of a method for integrating automated furniture accessories with automated furniture items is provided. At block 54, one or more items of identifying information associated with at least one automated furniture accessory coupled to a control component are received. For example, a control component 12 may receive items of identifying information (e.g., a device type or a manufacturer) associated with a particular automated furniture accessory 24. At block 56, at least one of the one or more items of identifying information is communicated to a remote device, with the remote device being in wireless, two-way communication with the control component, and one or more features of the at least one automated furniture accessory being controlled by the remote device based on communication of the at least one of the one or more items of identifying information. Accordingly, in one embodiment, features of an automated furniture accessory 24 may be controlled by the remote device 26 based on communication between the remote device 26 and the control component 12. In other words, by virtue of the direct connection of the automated furniture accessory 24 to the CAN bus 16 of the control component 12, as well as the wireless connection between the remote device 26 and the wireless communication device 14 of control component 12, the remote device 26 may control one or more features of the automated furniture accessory 24.

From the foregoing, it will be seen that this invention is one well adapted to attain all the ends and objects hereinabove set forth together with other advantages, which are obvious and inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A system for wirelessly integrating automated furniture accessories with automated furniture items comprising:

a control component comprising:

(1) a wireless communication device; and (2) a bus;

at least one automated furniture accessory coupled to the bus, said at least one automated furniture accessory separate from the automated furniture item; and a wireless remote device wirelessly coupled to the control component;

wherein the control component automatically receives one or more items of information provided by the automated furniture accessory in response to coupling the at least one automated furniture accessory to the control component, wherein one or more features of the at least one automated furniture accessory are controlled by the wireless remote device wirelessly coupled to the control component in response to communication between the control component and the wireless remote device, said communication comprising at least one of the one or more items of information provided to the control component by the automated furniture accessory according to a communication protocol between the control component and the wireless remote device.

2. The system of claim 1, wherein the bus is a controller area network (CAN) bus, and wherein the items of information are provided to the control component based on coupling the automated furniture accessory to the CAN bus of the control component.

3. The system of claim 1, wherein the wireless communication device is a two-way communication device that facilitates two-way communication between the control component and the wireless remote device.

4. The system of claim 1 further comprising the remote device wirelessly coupled to the control component, wherein the wireless remote device is adapted to receive information from and transmit information to the control component using the wireless communication device.

5. The system of claim 4, wherein the wireless remote device comprises updateable firmware adapted to receive information regarding an automated furniture accessory coupled to the control component.

6. The system of claim 4, wherein the wireless remote device comprises a screen comprising one or more control indicators, wherein the one or more control indicators are updated based on receiving information regarding an automated furniture accessory coupled to the control component.

7. A method for integrating automated furniture accessories with automated furniture items, the method comprising:

receiving an indication that an automated furniture accessory separate from an automated furniture item is coupled to a control component of the automated furniture item, said control component configured to control one or more features of the automated furniture item;

identifying one or more packets of information provided by the automated furniture accessory, wherein identifying one or more packets of information comprises identifying one or more packets indicating at least one protocol for communication between a wireless remote device and the control component for controlling one or more features of the automated furniture accessory; and communicating at least one of the one or more packets of information to the wireless remote device, wherein the wireless remote device is adapted to control one or more features of the automated furniture accessory based at least in part on communication between the wireless remote device and the control component upon receipt by the wireless remote device of the at least one of the one or more packets, wherein controlling the automated furniture accessory based at least in part on communication between the wireless remote device and the control component comprises executing the at least one protocol such that one or more features of the automated furniture accessory are controlled by the wireless remote device wirelessly communicating with the control component, wherein commands received from a user via the remote wireless device are communicated to the automated furniture accessory via the control component.

8. The method of claim 7, wherein receiving an indication of an automated furniture accessory comprises receiving an indication that an automated furniture accessory external to the control component is coupled to the control component.

9. The method of claim 8, wherein receiving an indication of an automated furniture accessory comprises receiving an indication of one or more of an accessory type, an accessory manufacturer, and an accessory model.

10. A method for integrating automated furniture accessories with automated furniture items, the method comprising:

receiving one or more items of identifying information associated with at least one automated furniture accessory separate from an automated furniture item, said at least one automated furniture accessory coupled to a control component of the automated furniture item, wherein the at least one automated furniture accessory comprises an external device coupled to the control component by a user after user purchase of the automated furniture item having the control component; and wirelessly communicating at least one of the one or more items of identifying information to a wireless remote device coupled to the control component, wherein the wireless remote device is in wireless, two-way communication with the control component, wherein one or more features of the at least one automated furniture accessory are controlled by the wireless remote device based on 1) receipt of the one or more items of identifying information associated with the at least one automated furniture accessory by the control component coupled to the at least one automated furniture accessory, and 2) wireless communication of the at least one of the one or more items of identifying information from the control component to the wireless remote device, wherein the one or more features of the at least one automated furniture accessory are indirectly controlled by the wireless remote device using at least one protocol for communication between the wireless remote device and the control component such that commands received from a user by the wireless remote device are communicated to the automated furniture accessory via the control component.

11. The method of claim 10, wherein the remote device comprises updateable firmware adapted to receive information regarding the automated furniture accessory coupled to the control component.

12. The method of claim 11, wherein the remote device comprises a screen comprising one or more control indicators, wherein the one or more control indicators are updated to provide one or more control indicators that are specific to the at least one automated furniture accessory.

13. The method of claim 10, wherein the at least one protocol for communication comprises an identity of one or more items of identifying information associated with the automated furniture accessory that enable the remote device to control the one or more features of the at least one automated furniture accessory.

14. The method of claim 10, wherein the wireless, two-way communication between the remote device and the control component is one or more of a MiWi and a Zigbee communication.

* * * * *